United States Patent
Labrie

(10) Patent No.: US 11,328,368 B1
(45) Date of Patent: May 10, 2022

(54) SYSTEM AND METHOD FOR THE AUTOMATED GENERATION OF SOCIAL EVENTS

(71) Applicant: Alexandre Raymond Labrie, Toronto (CA)

(72) Inventor: Alexandre Raymond Labrie, Toronto (CA)

(*) Notice: Subject to any disclaimer, the term of this patent is extended or adjusted under 35 U.S.C. 154(b) by 157 days.

(21) Appl. No.: 16/243,015

(22) Filed: Jan. 8, 2019

Related U.S. Application Data

(60) Provisional application No. 62/614,917, filed on Jan. 8, 2018.

(51) Int. Cl.
*G06Q 50/00* (2012.01)
*G06Q 10/10* (2012.01)
*G06N 20/00* (2019.01)

(52) U.S. Cl.
CPC ............ *G06Q 50/01* (2013.01); *G06N 20/00* (2019.01); *G06Q 10/1095* (2013.01)

(58) Field of Classification Search
CPC ..... G06Q 50/01; G06Q 10/1095; G06N 20/00
See application file for complete search history.

(56) References Cited

U.S. PATENT DOCUMENTS

| | | | |
|---|---|---|---|
| 8,700,540 B1 | 4/2014 | Zambrano et al. | |
| 8,909,646 B1* | 12/2014 | Fabrikant | G06Q 50/01 707/737 |
| 9,600,598 B2 | 3/2017 | Baecklund et al. | |
| 9,602,606 B2 | 3/2017 | Wheatley | |
| 9,621,600 B2 | 4/2017 | Yu et al. | |
| 2013/0238370 A1 | 9/2013 | Wiseman et al. | |
| 2014/0129505 A1 | 5/2014 | Lin et al. | |
| 2014/0365313 A1 | 12/2014 | Reese et al. | |
| 2015/0019273 A1* | 1/2015 | Grosz | G06Q 50/01 705/5 |
| 2015/0127628 A1* | 5/2015 | Rathod | G06F 16/955 707/710 |
| 2016/0239808 A1 | 8/2016 | Ryu et al. | |
| 2017/0109709 A1* | 4/2017 | Wu | G06F 7/02 |
| 2019/0130364 A1* | 5/2019 | Sun | G06Q 10/1093 |

\* cited by examiner

*Primary Examiner* — Mehmet Yesildag
*Assistant Examiner* — Ayanna Minor
(74) *Attorney, Agent, or Firm* — Lawrence S Pope

(57) ABSTRACT

A method involving the use of a system is disclosed. The system comprises a processor and an associated memory. The processor executes stored instructions and connects via electronic communication means to create and suggest social events with an associated list of attendees, time range, activity, and location. These events may come into being solely as a result of the system. The attendees are drawn from users with a profile comprising periods of time for which the user is available, personal interests and the identities of persons with whom the user is personally acquainted.

16 Claims, 5 Drawing Sheets

SYSTEM AND METHOD FOR THE AUTOMATED GENERATION OF SOCIAL EVENTS

TECHNICAL FIELD

The present application relates generally to automation using computer systems and particularly to the automated creation and recommendation of social events.

BACKGROUND

Some communication systems, including calendar websites and applications, allow users to create events or meetings. A created event or meeting typically includes an associated time and date and may include a title, description, and/or attachment that can be included in invitations. Invitations for events or meetings can be sent by the meeting creator to other users using a phone number, e-mail address, or other contact information.

DETAILED DESCRIPTION

Figure 1:
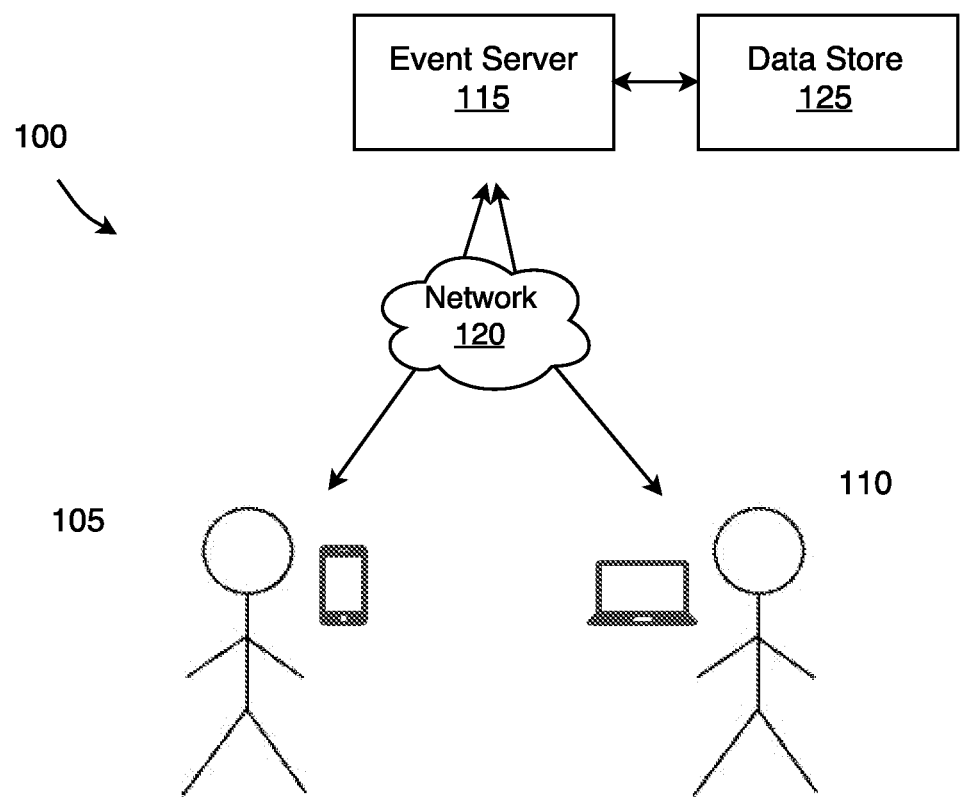
FIG. 1 is a block diagram that depicts a system for creating and managing events.

Some communication systems may allow users to create meeting invitations or other communications that relate to planned meetups between multiple people. For example, a user may send a meeting invitation which may be sent and/or received through e-mail or a similar service. A meeting invitation may include one or more components, such as a time range, location, description, and/or various other information.

Some systems may require users to create meeting invitations and input each component of a meeting invitation. For example, a user may create a meeting invitation by accessing a computer interface and selecting a start time, end time, location, and/or a description of an activity (e.g., having dinner, going to a sporting event). However, meetings, and particularly social events, can be difficult to organize between users (especially large groups of users) who each may have different availabilities, interests, and circles of friends. The manual organization of an activity between several different users can be ineffective or inefficient. Moreover, it can be difficult for users to accurately determine mutual interests of a diverse group of users. For example, users may be unaware of shared interests and/or shared available times with friends.

Embodiments described herein provide improvements over other communication systems. For example, some systems and methods described herein involve electronic generation of events. In some embodiments, meeting times, activities, and/or groups of users may be electronically selected using user-specific profile information which may include indications of when users are available, what activities users may be interested in, and users' circles of friends and/or acquaintances. In certain embodiments, events may be generated automatically without requiring user action. In this way, embodiments may provide improved simplicity in the creation of invitations for social and/or professional meetings. Moreover, embodiments provide for compiling and managing an extensive library of user data which may be used to create events which may be specifically tailored to the individual users who receive the invitations.

As used herein, an "event" may be an electronic item that may be generated by a computer. An event may be sent electronically to users (e.g., via e-mail, text message, or other notification) and may represent any organized activity in which several persons collectively participate as a group. Such participation of involved persons may be virtual (e.g., an online chatroom), telephonic, physical, or otherwise (e.g., a group of people participating in an event where each person independently watches the same film on the same night in their own homes).

One or more persons wanting to participate in an activity may utilize the herein-described system to facilitate the organization of an event. As used herein, a person utilizing the herein-described system may be referred to as a "user". An event may have one or more associated components. For example, an event may have one or more of an associated date, time range (e.g., start time, end time, duration), location (whether physical, virtual, or otherwise), activity, and score. Data received from users may be used to create an event having one or more associated components. Associated components may include a group of users (including identifiers, such as names or usernames, of the users in the group), dates, time ranges, activities, and locations.

FIG. 1 is a block diagram depicting an exemplary system 100 for creating and managing events. A first user 105 and a second user 110 may communicate bi-directionally with an event server 115 over a network 120. The event server 115 may be a single server or a network of servers and other devices. The first user 105 and second user 110 may send or receive data to or from the event server 115. Data from different users may be sent at different times and appear simultaneous in FIG. 1 only for illustration purposes. The event server 115 may process and store received data. The event server 115 may also access stored records related to the first user 105 and second user 110. Based on at least a portion of the received data or stored data, the event server 115 may create an event with one or more associated variables. The event server 115 may send a created event via the network 120 to one or both of the first user 105 and second user 110.

The event server 115 may store received data in a data store 125. The event server 115 may also access stored data from the data store 125.

The system may include one or more computing devices by which users may communicate with the event server 115. For example, a user may access a smartphone, laptop computer, tablet, personal computer, or other computing device. A user may send data to the event server 115 via a computing device and receive an event from the event server 115 via the same computing device or a different computing device. The first user 105 and second user 110 may utilize the same or different computing devices.

The system may further include a software program, running on a computing device, through which users may enter data for transmission to the event server 115. The software program may have any of a variety of forms, including a web page, web application or mobile application.

Users may input any of a variety of data into the software program for transmission to the event server 115. The software program may include prompts to suggest or require certain data which users may input. Data received from users may include variables of certain types, including availability data, interest data, connection data and location data. Users may have unique accounts in the system 100 through which individual users may be identified. An account may have a unique identifier that is associated with each data item related to the account. That is, each data item provided by a first user 105 may have an associated first identifier. The first identifier may be associated with any data items for the first user 105 that are stored within the system 100. In this way, the system 100 can track which data items are associated with which users.

Availability Data

The system 100 may assign scores, rankings, or preferences to time ranges. Users may provide availability data to the system 100. Additionally, availability data may be provided to the system 100 from a third-party service, for example a mobile application, website, or other computer system. Availability data may be indicative of dates and times during which the user is available, unavailable, or possibly available to participate in activities. A software program in the system 100 may provide users with an interface for inputting availability data. The interface may have any of a variety of forms. For example, the software program may present a calendar to users and instruct users to label individual days, weeks, or time slots as "available," "unavailable," or "unknown." Additional options may also be used. For example, a user may select a period of multiple days as being available for a particular type of activity, such as "available to travel." A user may also add conditions to availability for a time period. For example, if a user is working but would like to be available for coffee breaks, a user may indicate a period from 11 AM to 2 PM as "available for meetups lasting no more than one hour." In another example, if a user does not have access to transportation, a user may provide a time slot during which the user is available but unable to travel further than a given distance from a particular location.

Availability data may be segmented into time blocks. Time blocks may have varying sizes. For example, a time block may be a half hour (i.e., thirty minutes). In this example, availability from 1:00 PM to 2:30 PM may comprise three available time blocks: 1:00 PM to 1:30 PM, 1:30 PM to 2:00 PM, and 2:00 PM to 2:30 PM. In another example, a time block may be fifteen minutes, an hour, a full day, or any other period of time.

The system 100 may make modifications or additions to received availability data. Such modifications or additions may include scoring, ranking, or assigning a preference to portions of time within the availability data. For example, if a user indicates that the user is available from 2 PM to 5 PM and unavailable from 5 PM on, it may be assumed that the user has an appointment at 5 PM and may require some preparation or travel time before 5 PM. Accordingly, the system 100 may assign a preference for that user for the time slot from 2 PM to 4 PM over the 4 PM to 5 PM time slot. Based on that preference, the system 100 may be more likely to create events for the user during the 2 PM to 4 PM time slot than the 4 PM to 5 PM time slot. In an embodiment, users may manually indicate whether travel time is required before or after events.

Additional scoring or ranking may be added to availability data based on particular dates or time slots based on the position of the date or time in the year, month, week, or day. That is, the system 100 may be more likely to schedule events for users on certain days or during certain parts of the day than in others. In an embodiment, time slots during historically popular social event times may be ranked higher than others. For example, if a user indicates that the user is available in the evenings of December 31st and January 2nd, the system may rank the time slot on December 31st higher than January 2nd because December 31st is a more popular time for social events. Similarly, the system 100 may rank availability on a Friday night higher than on a Tuesday night.

Historical scheduling data for a particular user may cause a certain availability for that user to be ranked higher. For example, if a user's historical data shows that the user has almost always been unavailable on Wednesday nights, and the user then indicates that the user is available on a certain Wednesday night, the system 100 may rank that time slot higher than others because certain Wednesday night activities or activities with other users who are normally active on Wednesday nights would be available to the user and increase the user's variety of activities.

Users may have the ability to indicate both positive and negative preferences relating to availability. For instance, a user might indicate availability on both weekdays and weekends, but also indicate a positive preference for events on weekends. On the other hand, a user might indicate availability on every weekday but also indicate a preference against Wednesdays.

Interest Data

The system 100 may assign scores, rankings, or preferences to interests. Users may provide interest data to the system 100. Additionally, interest data may be provided by a third-party service, for example a mobile application, website, or other computer system. Interest data may be indicative of a user's interest level in participating in a particular activity or visiting a particular location. For example, interest data may include a listing of activities that a user has previously participated in or restaurants that a user has visited. Interest data may also include a list of activities or locations for which a user has provided positive or negative feedback. For example, after visiting a particular restaurant, a user may provide a score for the restaurant to indicate how satisfied the user was with the restaurant. Such feedback information may be received by the system 100 from an external software program, such as a restaurant review website with which the user has a registered account. In an embodiment, users may be presented, through a user interface, with a list of possible activities and prompted to indicate a level of interest in participating in the listed activities. Activities may be specific (e.g., attending a concert at a given venue on a given day) or general (e.g., "attending concerts" or "music").

The system 100 may make modifications or additions to received interest data. Additional interest data may be added based on interest data received from users. For example, if a user provides positive feedback for a particular restaurant, the system 100 may add other restaurants to the user's interest data based on the particular restaurant. The added other restaurants may be restaurants that are similar to the particular restaurant or restaurants that others users with similar interest data provided positive feedback for.

Interest data may be compared between users to generate scores for various interests. For example, a user's interest data may indicate a first interest (e.g., bowling) and a second interest (e.g., archery). If the first interest is shared by a larger number of other users than the second interest, the first interest may be given a higher score than the second interest. Scoring of interests may influence which interests are selected for events that include the user. For example, if a user is included in a group in which the first interest is shared by more users in the group than the second interest, the first interest may have a higher score and may be more likely to be selected for an event generated for the group than the second interest.

Interests may relate to a specific activity (e.g., attending Lakers games) or to an interest category (e.g., attending sporting events, attending NBA games). Users may provide feedback on both specific activities and categories. Users may be scheduled for only a limited number of events per category over a given time period. For example, a user who is scheduled for an event that involves bowling on a Monday night may not be scheduled for another event that involves bowling until the following week at the earliest.

Interest data may relate to particular businesses. For example, a user's interest data may reflect the user's interest in eating at a particular restaurant. Businesses may also provide information that can influence how events are scheduled for a particular business. For example, a business may provide data indicating that the business prefers having customers in the evening rather than in the afternoon. Accordingly, events that take place in the evening may be more likely to include an activity involving that business than events taking place in the afternoon. Businesses may also influence selections by bidding or otherwise providing an incentive for selecting the business for association with an event.

Users may have the ability to indicate both positive and negative preferences relating to interests. For instance, a user might indicate indicate a preference against skydiving. Alternatively, a user might indicate a positive preference toward a favorite interest. Users may then be considered to have a strong positive preference toward favorite interests, a positive preference toward selected interests, a neutral preference toward non-selected interests, and a negative preference toward interests indicated accordingly.

Connection Data

Connection data is any data which is indicative of a user's connections to other people. Connection data may be provided directly by a user. For example, a software program may prompt the user to input names/usernames or contact information of people (i.e., connections) that the user has a relationship with. Additionally, connection data may be provided to the system 100 from a third-party service, for example a mobile application, website, or other computer system. Such connections may be friends, co-workers, acquaintances, family members, or others.

The system 100 may apply one or more of a variety of algorithms to connection data to form groups of users. Users indicated in connection data as having a relationship may be grouped together into a clique. For example, the system 100 may apply the Bron-Kerbosch method or other algorithm to form "cliques" or "maximal cliques" of users. A "clique" is a collection of users in which each user is a direct connection of each other user in the clique. A "maximal clique" is a clique to which no additional user can be added while remaining a clique, i.e. there is no user remaining in the network who is a direct connection to every user in the clique. For example, a clique may consist of ten users from a network of users in a system. Each of the ten users is a direct connection with each of the other nine users in the clique. If there is no other user in the network of users who is a direct connection with all ten users in the clique, then the clique is a maximal clique. If, however, there is one or more users in the network of users who is a direct connection with all ten users in the clique, then the clique is not a maximal clique.

A group may be a collection of users in which each user is a direct connection of at least one other user in the collection of users. Users who are "direct connections" with each other know each other personally (e.g., have indicated each other as a connection), while users who are "indirect connections" may not know each other personally but have mutual connections (e.g., a friend of a friend, a friend of a friend of a friend, etc.). For example, a group may include a first user, a second user, and a third user. In the present example, the first user and the second user may be related to each other and the third user may be a friend of the first user. Even if the gathered connection data does not include a direct association between the second user and the third user, the system 100 may create an indirect association between the second user and the third user because of their mutual association with the first user. If users are added or removed from a maximal (or other) clique, the collection of users may no longer be a maximal (or other) clique but may be a group.

The system 100 may assign scores, rankings, or preferences to groups of users. Assigned scores may be used when generating a candidate event that includes a particular group of users. A group having a higher level of familiarity between users within the group may be assigned a higher score or ranking. For example, a first group may include five users who each have a direct connection with the other four users in the first group. The first group may be assigned a first score. A second group may also include five users. However, only one user in the second group may have a direct connection with the other four users in the second group. Each of the other four users in the second group may have one or more direct connections within the second group but also will have at least one indirect connection within the second group. Based on the indirect connections between users, the second group may be assigned a second score that is lower than the first score. Based on the scoring of the two groups, an event that includes the first group may be more likely to be created than an event that includes the second group.

Individual users may be included in multiple groups. For example, a first group may include a first user, a second user, and a third user. A second group may include only the first user and the second user. A third group may include the first user, the second user, and a fourth user. In the present examples, the second user and the third user may be indirect connections but not direct connections, while the first user and the second user may be direct connections. In such a case, the second group (which includes only the first user and the second user) may have a higher score than the first group (which also includes the third user) because the first group has indirect connections while the second group has only direct connections. Additionally, larger groups may have higher scores than smaller groups.

Users may have the ability to indicate both positive and negative preferences relating to connections. For instance, a user might import multiple connections from a third-party service, but also indicate a positive preference for certain connections such as best friends or family members. On the other hand, a user might indicate a preference against an acquaintance for some or all possible activities.

Location Data

The system 100 may assign scores, rankings, or preferences to locations. Users may provide location data to the system 100. Additionally, location data may be provided to the system 100 from a third-party service, for example a mobile application, website, or other computer system. Location data is any data that gives an indication of a user's likely geographic position during various time periods. In one embodiment, users are solicited to enter the name of an urban area with which they are associated. For instance, a user may give New York City or San Francisco. The city name entry may be subject to a routine to correct for errors and aggregate the entries from a common urban area under a single city name. On the other hand, the system may react to the input of a particularly geographically large urban area, for instance Los Angeles, by prompting the user to provide a more precise location. The system may assign a common GPS location to all the users associated with a given urban area, typically a GPS location representative of the center of that urban area. The location data may be enhanced by identifying the IP address from which a given user logs into the system. It may also be enhanced by having users provide access to the GPS coordinates of their cell phones, for instance by downloading an app and granting it access.

Dynamic location data, such as that obtained from an IP address or from a mobile phone's GPS signal, has the advantage of automatically updating for any given user. However, the system may periodically prompt users to provide static location information, such as identifying an urban area, to update such information.

Location data may be used in both the creation and scoring of events. The system may limit both the composition of the subsets and the activities with a fixed situs using location data as explained in more detail in the discussions of processes 200 and 300. The system may also use location data to evaluate travel duration based on each user's expected method of travel between users in a given subset and available locations for each ranked interest or a situs for a candidate event with which they are associated.

Users may have the ability to indicate preferences relating to locations. For instance, a user might indicate indicate a preference against traveling to certain locations, beyond a certain distance, or for more than a certain duration with a selected method of travel. Alternatively, a user might indicate a positive preference toward a favorite area.

User Preferences and Requested Events

The system may use user preferences to adjust the default values that it associates with all of the variables considered in scoring an event. For instance, the system may assume that a user has equal affinity for all of the connections, interests, times, and locations that the user initially inputs when signing up with the system. These user preferences may be expressed from user input or discerned by the system evaluating users' responses to invitations to events. For instance, a user may input how often that user would like to receive events for a certain activity. On the other hand, the system may observe a pattern in a user's responses to invitations to events and use these observations to adjust one or more default values. For instance, a user may consistently decline invitations to events on Wednesday evenings and the system may then give a negative weighting to including this user in Wednesday evening events or a user may consistently decline invitations that are located beyond a certain distance from the user's location and the system may update the user's required threshold distance or travel duration for inclusion of that user in an event.

The system may use such expressed or discerned preferences to affect the scoring of an event. For instance, if a user has expressed a preference to not be invited for bowling, the system may reflect this in the scoring of events that include both that user and bowling or if the user is perceived to have a pattern of declining Wednesday evening invitations, the system may assign a lower score to events including this user and this time slot. Users may express or the system may discern combinations of preferences. For example, a user may prefer not to meet with co-workers during the weekend, or the system may discern that a user consistently declines invitations to events that include that user and bowling on Wednesdays, but not bowling during the weekends.

The system may allow users to request the creation of a particular event by selecting one or more values or assigning a limited range of values to some of the variables which make up an event. For instance, a user might want to hold a birthday celebration for a friend at a particular restaurant but might want to rely on the system to provide a list of other attendees and a convenient time based on the data the system has. On the other hand, the user may select the attendees but want to rely on the system to provide an appropriate activity and time. In this instance, the user might limit the event to occur in the evening without giving a specific time.

In an embodiment, the system may request the creation of certain kinds of events. For example, the creation of an event for a birthday celebration may not be requested by a user but may instead be requested by the system. Based on a user's profile data, the system may request this birthday celebration on a given date and with certain connections or interests that the user prefers, thereby limiting certain variables for the event and leaving processes 200 and 300 to determine the other variables. Events requested by the system may be ones deemed important in an individual's life (e.g., birthdays, going on a date, networking), socially relevant (e.g., holidays, volunteering, voting), or emergencies (e.g., visiting a friend who had an accident at the hospital or leaving an area affected by a natural disaster).

Generating and Suggesting Events

Events may be generated based on user availability data, location data, interest data, and connection data. In an embodiment, the event server 115 of FIG. 1 may generate events. That is, events may be generated automatically based on stored or received data.

Figure 2:
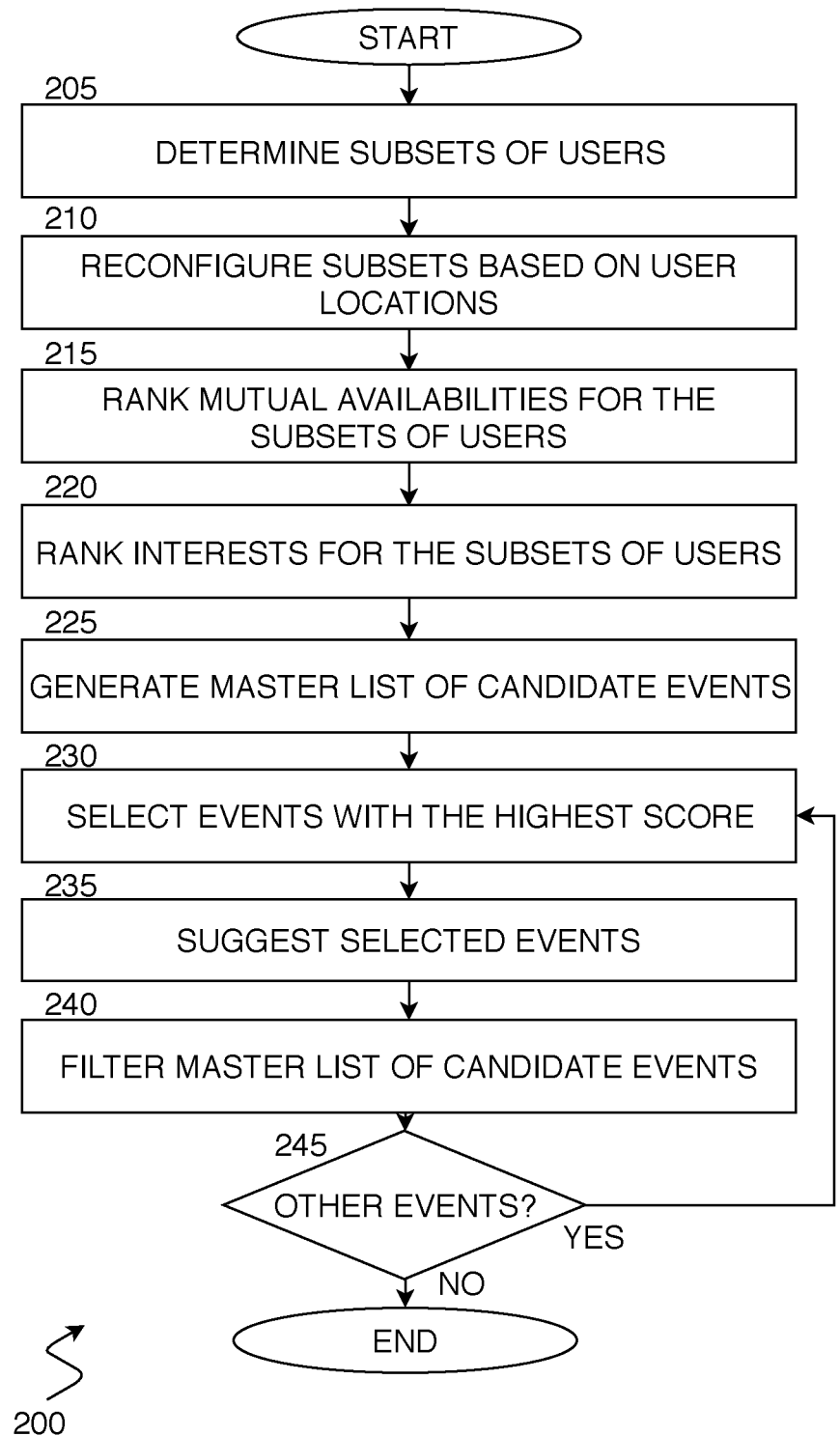
FIG. 2 is an example flow diagram depicting a process for creating and suggesting events using subsets of users.

The system 100 may utilize one or more of multiple methods for generating events. FIG. 2 is an example flow diagram depicting a process 200 for generating and suggesting events using subsets of users. Steps of the process 200 may be performed sequentially in any order or in parallel for multiple events.

At step 205, the process 200 involves determining one or more subsets of users from a set of users. A subset may have any number of users ranging from two users to all of the users in a network of users. In an embodiment, the subsets of users may be maximal cliques. A subset may have any number of users ranging from two users to all of the users in a given network of users. Individual users may be included in multiple subsets.

The process 200 may involve determining a largest maximal clique size. A largest maximal clique size may be the largest possible clique size at which a maximal clique may be created. For example, a network may include thousands of users, each of which is directly or indirectly connected with some of the other users. It may not be possible to create any clique of users larger than fifteen users from the network in which all of the users are direct connections with each other. That is, a clique of fifteen users may be created in which all fifteen users have a direct connection with each of the other fourteen users. However, there may not be an additional user in the network who may be added to the clique such that the additional user is a direct connection with all fifteen users and there may not be another maximal clique that can be created from the network with more than fifteen users. In this case, the largest maximal clique size may be fifteen users. In an embodiment, all the various different cliques having the largest maximal clique size, for example fifteen users, may be evaluated in a first cycle, and in subsequent cycles maximal cliques having smaller clique sizes may be evaluated.

In an embodiment in which the maximal cliques of the largest size are analyzed first, the process may be repeated if it is determined that there are other maximal cliques smaller than the largest maximal clique. For example, if the largest maximal clique size was fifteen users, it may be determined whether there are smaller maximal cliques in the network of users. The process may continue until the next largest clique size has a certain number of users, for example two or three.

In an alternative embodiment, a subset of users may be determined by first adding a first user to the subset. Other users may be added based on the first user's connection data. For example, after selecting a first user, the first user's connection data may be analyzed to determine a second user who has the most mutual connections, i.e. the most overlap in friends, with the first user. In this example, the second user may be added to the subset. A third user may be added to the subset by determining which user has the most mutual connections with the first and second users, and so on. Additionally or alternatively, other users may be added based on the first user's other profile data. For example, after selecting a first user, the first user's profile data may be analyzed to determine a second user who has compatible characteristics (e.g., age, gender, relationship status, interests, location, etc.) to add to the subset.

In an embodiment, subsets may be determined on the basis that each user in a given network be selected at least once. Alternatively, individual users may be selected for inclusion in subsets based on data received by the system 100. For example, a user who is accessing a service for the first time may be selected on the basis of being a new user.

A user may request the creation of an event and select the subset's members, leaving the rest of the system to determine other event variables.

At step 210, the process 200 involves analyzing location data to ensure that all the users in a subset are within a threshold distance or travel duration from a common location. In this regard, distances may be measured using GPS coordinates for each user. The GPS location of each user may be determined directly from the user's cell phone or indirectly by converting the user's inputs (e.g., address, city, zip code, etc.), IP addresses or otherwise.

In an embodiment, the common location may be the median location between all the users in a subset. Individual users who are not within a threshold distance of the median location or whose travel duration to the median location is above a threshold duration may be removed. In the event that multiple users are too far from the median location, step 210 may examine grouping users into new subsets using the median location between them. For instance, if a subset contains three users from San Fransisco and two or three users from New York City, two new subsets may be created to generate two reasonable median locations, resulting in a total of three subsets. In an alternative embodiment, the common location may be an urban area, for instance San Fransisco, and the composition of subsets may be adjusted such that all the users are within a threshold distance of that urban area, typically represented by the GPS location of the center of that urban area.

In an embodiment, the system may allow a user to be part of a subset even if that user is not within the default threshold distance or travel duration of the subset's median location if that user has expressed or the system has discerned that that user has a different threshold distance or travel duration preference. Similarly, the system may remove a user who is within the default threshold distance or travel duration of the subset's median location but is not willing to travel as much as the average user.

In an embodiment, step 210 may pass subsets on to steps 215 and 220 for the possible creation of virtual events, such as watching the same Internet-provided movie at the same time or playing an Internet game together, without consideration for the threshold distance or travel duration between users and a common location.

A user may request the creation of an event and select its location or limit its possible locations, leaving the rest of the system to determine other event variables.

At step 215, the process 200 involves analyzing availability data to determine and rank mutual availabilities within each subset of users. For each subset, each user may have associated availability data received or created at the system 100. The availability data for each user may indicate periods of time during which each user is available to participate in events. One or more time periods may be determined during which two or more users are available. If more than one time period is determined, the time periods may be compared to rank (e.g., by giving a higher ranking to a time period shared by more users than another time period) the possible time periods. Ranking time periods may involve evaluating the number of available users, length of time, time of day, or date of the time period. For example, a time period during the evening may have a higher ranking than a time period in the morning. This may be because evenings may be determined to be more popular for social activities. Similarly, a time period on a Friday or on a holiday may have a higher rank than a time period on a Tuesday or other non-holiday. Mutual availabilities may be restricted to a certain timeframe. For example, only availability data for a particular 7-day period may be analyzed for purposes of determining mutual availability. In this example, the timeframes outside the particular 7-day period may be used for a different event creation process.

Users who are partially available for a given mutual availability may nonetheless be considered available. For example, if a mutual availability is two hours long and a particular user is only available for the first hour and a half, the user may still be considered available. In an embodiment, if a user is unavailable at a midpoint of a mutual availability (e.g., the user is unavailable at 2 PM and a mutual availability is from 1 PM to 3 PM), then the user may not be added to the mutual availability.

A subset of the determined mutual availabilities may be used in generating candidate events. For example, using the determined mutual availability rankings, each of the top seventy-five percent of ranked mutual availabilities may be included when generating candidate events. Additionally, it may be required that the mutual availabilities be shared by a certain number of users, for example fifty percent plus one. Machine learning may be used to determine other conditions required for inclusion in candidate events.

Different mutual availabilities may have different associated users. A mutual availability may be indicative of a time period during which a first group of users is available. Another mutual availability may be indicative of a different time period during which a second group of users (which may or may not include one or more users from the first group) is available. Mutual availabilities may be ranked based on how many users are available during the mutual availability. For example, a mutual availability for which all users in a group are available may have a higher rank while a mutual availability for which only a subset of users in the group are available may have a lower ranking.

Longer mutual availabilities may be ranked higher than shorter mutual availabilities. For example, a mutual availability that is a full hour during which nine users are available may be ranked higher than a mutual availability that is only a half-hour during which ten users are available. That is, while the tenth user increases the ranking of the latter availability, the increased length of the former (full hour) availability would also result in an improved ranking. In this example, a tenth user who is unavailable during the full hour availability may be invited to the event in case the user is able to attend even for only a portion of the time.

A user may request the creation of an event and select its time range or limit its possible time ranges, leaving the rest of the system to determine other event variables.

At step 220, the process 200 involves analyzing interest data to determine and rank (e.g., by giving a higher ranking to an interest shared by more users than an another interest) possible activities for each subset of users. The possible activities may be selected based on interest data of each of the users in the group. Each user may have associated interest data that may include activities positively rated by the user and activities suggested by the system 100. Activities may include things to do (e.g., having coffee, playing basketball), places to visit (e.g., particular restaurants, amusement parks), and other interests (e.g., a user's favorite band that performs concerts, a user's favorite sports team). Activities may have a minimum, desired, or maximum number of users.

Activities may be ranked in part based on levels of interest of users in a particular subset. For example, an activity for which a majority of users in a subset have shown a strong level of interest (e.g., through previous participation in events including the activity or by indicating a level of interest in the activity) may have a higher rank while an activity for which only a minority of users in the group have shown a low level of interest may have a lower ranking.

A subset of the determined activities may be used in generating candidate events. For example, using the determined activity rankings, each of the top seventy-five percent of ranked activities may be used when generating candidate events. Additionally, it may be required that the mutual interests be shared by a certain number of users, for example fifty percent plus one. Machine learning may be used to determine other conditions required for inclusion in candidate events.

A user may request the creation of an event and select its activity or limit its possible activities, leaving the rest of the system to determine other event variables.

At step 225, the process 200 involves generating a master list of candidate events based on the determined subsets, location, and ranked mutual availabilities and interests. A candidate event may be created for each combination of mutual availability and interest above a certain ranking. The process of generating a master list of candidate events is described in further detail herein with respect to FIG. 3. Candidate events in the master list may have associated scores.

If a given mutual availability represents a longer length of time than the required length of time for an activity it is combined with, the mutual availability may be shortened to the required length of time for the activity or multiple candidate events may be generated. For example, if each user in a group is available from 6:00 to 9:00 on a certain day, but the required length of time for the chosen activity is only two hours, the mutual availability for the group may be shortened to a period of time from 6:00 to 8:00, 7:00 to 9:00, or any other two-hour period within the 6:00 to 9:00 range for scoring purposes. Alternatively, a candidate event involving that group and activity may be generated for each possible shortened time period.

At step 230, the process 200 involves selecting one or more events having the highest event score. Selection may also depend on a threshold score (e.g., only events above a certain score are selected), the number of candidate events in the master list, or otherwise. In the event that two or more events with identical scores only differ slightly, for example if a first event is from 6:00 to 8:00 and a second event is from 7:00 to 9:00 and all other event variables are identical, one of the two events may be deleted at random. The required uniqueness of an event to avoid deletion may be determined by the number of variables that differ, the values of these variables, and/or machine learning.

At step 235, the process 200 involves suggesting the selected event or events by sending invitations to the users associated with the event or events. Alternatively, selected events may be added to a list of events to be sent invitations at a later time. Event invitations may be sent in any form, for example e-mail, text message, mobile application notification, website notification, or phone call. In an embodiment, users associated with an event may receive a text message or other mobile notification indicating that the user should access a website, mobile application, or web application to accept or decline an event invitation.

Users may invite other users to join an event they are a part of as long as it does not have the maximum number of users required for its activity to occur. If only a single user, a number of users below a given threshold, or a number of users below the minimum required for an activity to occur accepts an invitation for a particular event, the event may be canceled. Alternatively, users may be added to events to compensate for declined invitations. In an embodiment, users may only be added if the number of accepted invitations is below a certain threshold.

Some events may have a specific location or venue. In some cases, a specific location or venue may be required for an event to take place. For example, a candidate event that includes a bowling activity may be canceled if a bowling alley that can accommodate the event components (e.g., time, date, number of people) is not available. In an embodiment, businesses may register with the system 100 to bid for, volunteer for, or accept a hosting role for events of certain activities. If a specific business cannot be paired with a certain event, the event may not be suggested or may otherwise be removed from the master list before it would have been suggested. Step 235 may also test whether the distance between a specific location or venue and the median location of the subset being considered for this event exceeds a threshold and therefore should not be suggested. Depending on the activity, the threshold distance may differ. For example, a restaurant may be required to be within five miles, but a camping area may be required to be within fifteen miles.

At step 240, the process 200 involves filtering (i.e., removing) candidate events from the master list of candidate events. The event or events selected at step 230 may be removed. Additionally, when a candidate event is selected at 230, its selection may impact the selection of other events. For instance, this selection may make some of the users associated with that event unavailable for other events in the master list. Such other events could then be removed from the master list or reconfigured to exclude these users who become unavailable due to the previously selected event. Reconfigured events may become new events to be scored in process 300 to reflect their reconfiguration.

Events that remain in the master list after filtering is applied may be rescored. For example, event scores may be adjusted such that there be a certain average number of events per user in a given cycle. A target average number of events per user may be four events per week. Accordingly, events that include users who have fewer than the average number of events per cycle may have their scores increased. Additionally, machine learning may be used to determine a desired number of events per user per cycle.

The steps of process 200 may be performed once per day, once per week, or at any other pace, representing a "cycle." For each cycle, a given user may be included in only a threshold number of events. A default threshold may be set by the system but users may also have the ability to set thresholds to their preference. For example, any event in the master list that includes a user who has already been included in one suggested event may be removed from the master list or reconfigured without that user during a given cycle.

Additionally, events may be removed or reconfigured based on interests or timeframes associated with the events. In an embodiment, events may be removed or reconfigured to prevent a user from being included in more than a threshold number of events with an identical activity over a given time period. A default threshold may be set by the system but users may also have the ability to set thresholds to their preference. For example, if an event involving bowling is suggested that involves a user, any other event in the master list involving bowling that includes that user may be removed from the master list or reconfigured. In a similar manner, events may be removed or reconfigured to prevent a user from being included in more than a threshold number of events with the same timeframe. For instance, if an event is suggested that takes place on a weekday evening, any other event in the master list involving that timeframe that includes that user may be removed from the master list or reconfigured.

In an embodiment, events may be removed or reconfigured to prevent a user from being included in more than a threshold number of events with a similar group over a given time period. A default threshold may be set by the system but users may also have the ability to set thresholds to their preference. A group may be considered similar to another group if there is a certain percentage of overlap in users, for example seventy-five percent of the same users in both groups.

In an embodiment, events may be filtered such that only groups having a threshold number of users who have not received a threshold number of event invitations may be included in new events. If a certain number of users in a group has already received a certain number of event invitations, that group may not be associated with new events. For example, if at least half of the users in that group have not received at least one event invitation, candidate events involving that group would remain in the master list. However, if more than half of the users in the group have already received one event invitation, candidate events involving that group would be removed from the master list.

Candidate events that are filtered out at step 235 because of the previous suggestion of another event may be reexamined if that other event fails to actually take place, for instance as a result of receiving too few acceptances. Additionally, users who decline an invitation to an event may be considered for inclusion in other events that were initially unavailable to them because of their inclusion in the declined event.

At decision block 245, it is determined whether there are any candidate events remaining in the master list that can be selected. If so, the process 200 returns to step 230. If not, the process 200 ends.

Machine learning may be used holistically or at any step in order to maximize the number of event suggestions accepted by users, maximize the percentage of event suggestions accepted by users, minimize the number of event suggestions declined by users, minimize the percentage of event suggestions declined by users, ensure each user's satisfaction with recommended events, or for any other reason deemed desirable for the system. Artificial intelligence may also determine what is desirable for the system and make any change accordingly.

Scoring Events

Figure 3:
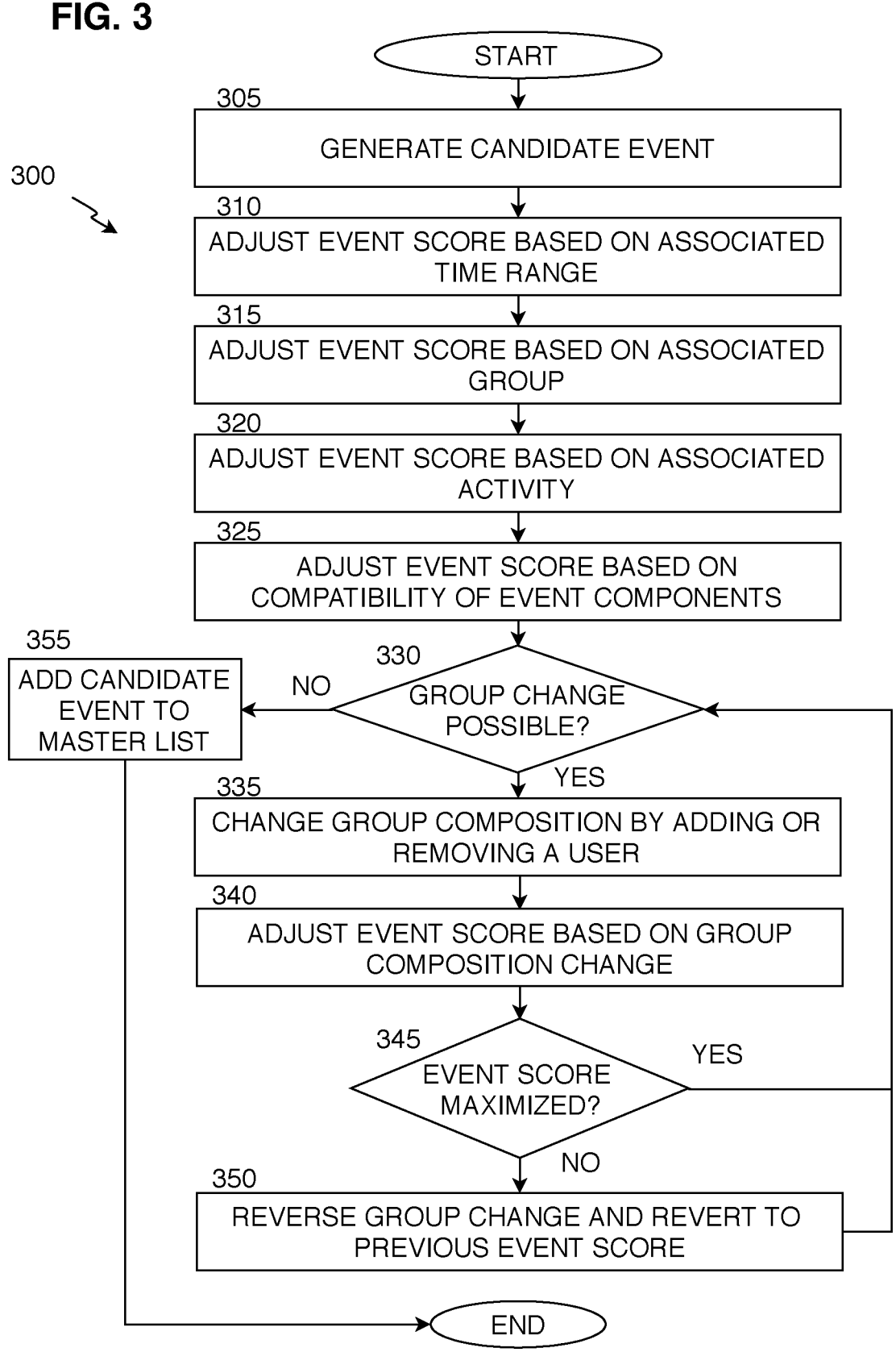
FIG. 3 is an example flow diagram depicting a process for generating and scoring candidate events for inclusion in a master list of candidate events.

As described above, a set of candidate events may be generated to compile a master list of candidate events. FIG. 3 is an example flow diagram depicting a process 300 for generating and scoring candidate events for inclusion in a master list of candidate events. The steps of FIG. 3 may be repeated any number of times to generate and score any number of candidate events. Moreover, the process 300 as a whole or the steps of process 300 may be performed multiple times sequentially in any order or simultaneously for generating multiple candidate events. The number of generated candidate events may be based on the subsets and rankings of activities and time ranges as described in FIG. 2.

At step 305, the process 300 involves generating a candidate event. A candidate event may be a data object with an associated set of components, including a group of users (e.g., a clique), a time range (e.g., date, start time, and end time of the candidate event), an activity, a location and a score. Each of the components may be selected based on individual component scoring or ranking (e.g., using the components ranking described in FIG. 2 herein). The score of the event may be based on the score of each individual component. An event score may be initially generated as a default value (e.g., 0).

At step 310, the process 300 involves evaluating the associated time range to adjust the candidate event score. In an embodiment, event scores may be increased with an increased length of the time range. The particular time or date of the mutual availability may also affect the score. For example, event scores may be increased for events having associated mutual availabilities during popular socializing times (e.g., evenings after 6 PM) and days or dates (e.g., Friday night, New Year's Eve). Events associated with time ranges having certain lengths or during certain times that users historically accept at an above-average percentage or provide more positive feedback may have higher scores. Machine learning may also be applied to adjust event scores based on time ranges.

The number of mutual availabilities considered in selecting the associated time range may also affect the event score. For example, an event score may be lower if the associated group has several mutual availabilities that were considered before a particular time range was selected for association with the event than if the group had only one or two mutual availabilities that could be considered. The event score may also be increased if the event includes a user who has limited availability and therefore has received few or no invitations in the current or previous event suggestion cycles.

A time range may be shortened or lengthened based on a maximum, minimum, or desired duration. Such adjustments may be based on the associated activity. For example, if an associated activity is watching a movie, the activity may have a minimum duration of at least the length of the movie. The associated activity may also have a desired duration. For example, if an associated activity is having dinner, the desired duration may be two hours. If users accept invitations for dinner events at a higher rate if the duration of the event is two hours than for any other duration, the desired duration for dinner events may be determined to be two hours. Moreover, if a particular group of users accepts invitations at a higher rate for events that have a particular duration, the particular duration may be set as a desired duration for events involving the particular group of users. In another embodiment, a desired duration may be a midpoint between a minimum and maximum duration for a particular activity or group. The desired duration may also be determined using machine learning.

A time range may be adjusted based on a specific start time or end time. For example, if the associated activity is seeing a play, the time range may be adjusted to reflect a specific performance's start and end times.

A user may express a preference or the system may assume a preference based on previous suggestions or discern a preference from a user's pattern of responses to invitations for certain time ranges. For instance, a user may prefer events that occur on Friday evenings between 7 PM and 10 PM and this preference may impact the score of events associated with that user. The system may assume a negative preference toward a time range that a user has previously received or discern a negative preference toward a time range that a user has previously declined in order to foster more event variety for that user. Each user's preference may affect the score of an event that includes that user.

At step 315, the process 300 involves evaluating the associated group of users to adjust the candidate event score. The group of users may be a maximal clique, a non-maximal clique, or any other collection of users. The number of users in the group and the interconnectedness of the users in the group may influence the score of the event. For example, a greater number of users may correlate to a greater score. Desired group sizes may be determined based on user feedback, previous user responses to invitations, and/or by machine learning. A greater level of connection between users may also correlate to a greater score. For example, if all users in the group are direct connections with every other user in the group (as in the case of a maximal clique), the event score may be increased by a greater amount than if not all users are direct connections with every other user in the group.

Event scores may also be adjusted based on the number of events with which users in the group have previously been associated. For example, if a user in a group has never previously received an event, then the event score may increase.

A user may express a preference or the system may assume a preference based on previous suggestions or discern a preference from a user's pattern of responses to invitations with certain groups. For instance, a user may prefer events with a group of friends from school as opposed to one from work and this preference may impact the score of events associated with that user. Additionally, a user may have a positive or negative preference for events that include certain individuals. The system may assume a negative preference toward individuals that a user has previously been scheduled with or discern a negative preference toward individuals that were included in events that the user has previously declined in order to foster more event variety for that user. Each user's preference may affect the score of an event that includes that user.

At step 320, the process 300 involves evaluating the associated activity to adjust the candidate event score. The level of interest of users in the group in the associated activity may influence the event score. For example, if the associated activity is only included in a single user's (of the users in the event) interest data, the selected activity may result in only a minor increase or a decrease in event score. If the associated activity is included in several users' interest data, the activity may cause a greater increase in event score. Moreover, activities themselves may influence the event score in different ways. For example, an activity that is only available for a short time (e.g., a traveling show) may cause a greater increase in score than an activity that is more readily available (e.g., visiting a local museum).

The number of mutual interests considered in selecting the associated interest may also affect the event score. For example, an event score may be lower if the associated group has several mutual interests that were considered before a particular interest was selected for association with the event than if the group had only one or two mutual interests that could be considered. The event score may also be increased if the event includes a user who has limited interests and therefore has received few or no invitations in the current or previous event suggestion cycles. The score may be affected by user feedback from previous events involving certain activities, which activities were associated with events that users accepted at high percentages, and/or machine learning.

A user may express a preference or the system may assume a preference based on previous suggestions or discern a preference from a user's pattern of responses to invitations regarding certain activities, including their possible locations. For instance, a user may prefer canoeing over swimming and this preference may impact the score of events associated with that user. The system may assume a negative preference toward an activity or its possible locations that the user has previously received as a suggestion or discern a negative preference toward an activity or its possible locations that a user has previously declined in order to foster more event variety for that user. Each user's preference may affect the score of an event that includes that user.

At step 325, the process 300 involves evaluating compatibility between the components of the candidate event to adjust the candidate event score. In an embodiment, event scores may be changed based on compatibility between the associated time range and the associated activity. For example, if the time range is in the morning and the activity is going to the pub, the event score may be lowered. In another embodiment, the level of correlation between two or three of the time range, the selected activity including its possible locations, and the group including its size, may affect the event score. For example, for a group of ten users, the event score may increase more if "playing basketball" is the associated activity than if "playing tennis" is the associated activity because ten users may not be able to play tennis at the same time.

Different components of an event may be weighted differently in scoring events. For example, if greater weight is placed on the group, the group's contribution to the event score may be greater than the contributions from the time range or activity. Weights may be applied to a variety of components of events, including the level of interconnectedness of users and the mutual availabilities. Weights may be determined through pattern recognition, machine learning, or explicitly expressed user preferences to maximize acceptance of event suggestions.

User preferences for a combination of time ranges, activities including their possible locations, or groups may impact the score given to a candidate event. In this regard, the system may solicit explicit user input of preferences. The system may also assign user preferences based on a user's pattern of responses to previous invitations or through the use of machine learning.

At decision block 330, the process 300 involves determining whether a change in the group associated with a candidate event is possible. A change in the group may be considered possible if, as a first evaluation, there is at least one user from the initial group or at least one user directly connected to the initial group who has yet to be evaluated by the loop involving steps 330 to 350, and if, as a second evaluation, there is at least one user directly connected to the group resulting from the first evaluation. If a change is possible, the process 300 proceeds to step 335. If not, the process 300 proceeds to step 355. The loop of steps 330 to 350 may first be run for users initially associated with a candidate event, for users directly connected to at least one user initially associated with a candidate event, and for users directly connected to users who are added to a candidate event based on their direct connection with at least one user initially associated with a candidate event. In this regard, the initial group may have been a clique.

After all users from the initial group, all users directly connected to the initial group, and all users directly connected to users who are added to a candidate event based on their direct connection with at least one user in the initial group have been evaluated by the loop from steps 330 to 350, if the resulting number of users is below the minimum number of users or above the maximum number of users required for the activity being considered, a change in the group may be required as opposed to only possible. Events may have minimum, maximum, or desired numbers of users. For example, an event with an associated activity of playing hockey may have a minimum of four users, a maximum of 15 users, and a desired number of 10 users. In this example, if the number of users in the event is below four users, it may be determined at decision block 330 that a change is required, resulting in process 300 proceeding to step 335.

At step 335, the process 300 involves removing initially included users from or adding users directly or indirectly connected to someone in the initial group to the candidate event. Additional users may only be users who are available during the time of the event and have interest data that is compatible with the chosen activity. Users who are partially available during a selected time range may be added to the event. For example, if an event is two hours long and a particular user is only available for the first hour and a half, the user may still be added. In an embodiment, if a user is unavailable at a midpoint of a time range (e.g., the user is unavailable at 2 PM and an event is from 1 PM to 3 PM), then the user may not be added to the event.

Additional users may be selected or provide a greater increase in score based on their level of connection with the other users in the group. For example, the percentage of users in the group that a user being considered for addition knows might influence addition (e.g., a user who knows 75% of the users in the group is more likely to be added than one who knows 25% of them). Additionally, a user's strength of connection to at least one user in the group might influence addition (e.g., the boyfriend or husband of someone in the group is more likely to be added than someone who is only an acquaintance to every member of the group).

An initially included user may have a negative effect on the event score because of their own preference or that of the other users in the group. As indicated for each step from 310 to 320, users may provide preferences regarding the group, time range, or activity. Users may also provide preferences regarding the size of events in which they would like to participate. For example, a user may indicate or the system may learn from the user's pattern of responses to events that the user does not want to participate in activities with more than four users. In this example, the user may be removed from the group unless the event has less than four users.

If the number of users in the group is below the minimum required for the activity to occur, additional users may be added even if they negatively contribute to the event score. Users who contribute the least negatively to the score may be added first. Similarly, if the number of users in the group is above the maximum required for the activity to occur, users may be removed even if they positively contribute to the event score. Users who contribute the least positively to the score may be removed first.

At step 340, the process 300 involves adjusting the event score based on the change in the user group. The event may be scored with users added or removed from the group. The score of the event may be increased further if the number of users is within the minimum and maximum number of users required for the activity to occur. Furthermore, the event score may be increased further when the number of users is closest to the desired number of users. Adjusting the event score may involve repeating steps 310 through 325 for the event with the added user or without the removed user.

At decision block 345, the process 300 involves determining whether removing an initially included user or adding an additional user to the group maximizes the event score. This determination may first involve evaluating whether the group change improves the score by a threshold amount. The threshold amount may be adjusted as desired and may be determined using machine learning. In an embodiment, the threshold amount may influence the score of the candidate event. For example, a higher threshold amount for adding users to the event may correlate to a higher event score. Additionally, decision block 354 may consider multiple iterations of the loop from steps 330 to 350 when determining whether a user addition or removal maximizes the score. For example, if a previous iteration of the loop resulted in a user who provides a small positive effect to the score to be added to the event but also the maximum number of users for the event being reached, if the current iteration of the loop evaluates a user who would provide a larger contribution to the score if that user were to be added, the user who was originally added may be removed in favor of adding the new user. If it is determined that the group change being evaluated maximizes the candidate event score, the process 300 returns to step 330. If not, the process 300 proceeds to step 350.

At step 350, the process 300 involves reversing the change to the group. The process may then return to step 330 for an evaluation of further changes.

At step 355, the process 300 involves adding the generated candidate event to a master list of candidate events.

Additional Method

Figure 4:
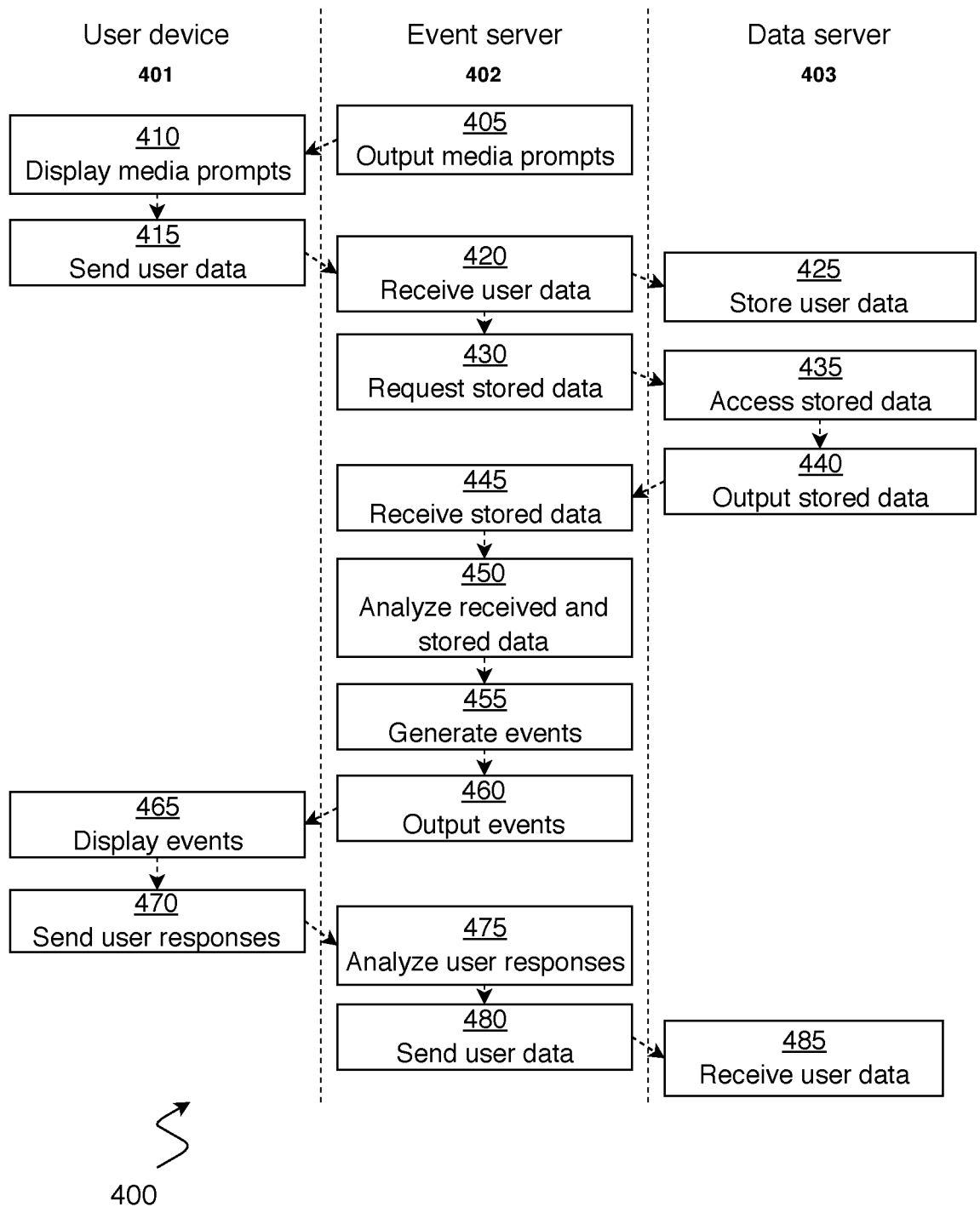
FIG. 4 is a swim-lane diagram of an example process for creating events.

FIG. 4 is a swim-lane diagram of an example process 400 for creating events. The process 400 includes steps that can be performed by different devices or entities, including a user device 401, an event server 402, and a data server 403. The event server 402 and data server 403 may each represent systems of multiple servers. The process 400 depicts how a user interacts with generated events and influences events to be generated in the future.

Media prompts are outputted (405), e.g., by the event server 402. A media prompt may be used to prompt users to provide information for use in creating events. For example, the media prompts may ask users to provide availability data, interest data, location data and connection data. Prompts may have a variety of forms. For example, a media prompt may ask a user to list activities that the user enjoys participating in. In another example, a media prompt may ask users to select from a list of possible activities one or more activities that the user enjoys participating in. Similarly, a media prompt may ask a user to select time blocks (e.g., half-hour blocks) from a particular day to indicate the user's availability during that time block. Alternatively, a media prompt may ask users to indicate their availability as they would in regular conversation, for example by typing "on weekends between 11 and 10" and submitting the text, leaving the system to select the relevant time blocks by converting the text input using speech pattern analysis. The media prompt may present a list of other users included in the stored data and ask the user to indicate if the user knows any of these listed users. That is, the media prompt may include a set of availability data, interest data, location data and/or connection data out of which the user can make selections to create or enhance a profile. In an embodiment, users who do not receive a threshold number of invitations within a given time period or receive multiple invitations to events below a threshold score may receive a media prompt suggesting that they update their lists of connections, availabilities and/or interests to enhance the probability of their receiving more or better invitations. Such a prompt may be generated on a weekly basis. During an event or shortly prior to it, media prompts may provide reminders to users about events or ask users to select options regarding the event, for example by selecting what to eat from a restaurant menu. Media prompts may be used to solicit any user response that can be used to enhance that user's experience.

Media prompts are displayed (410), e.g., by the user device 401. The user device 401 may be any device capable of receiving data from the event server 402, displaying the media prompts in a user interface, receiving user input, and sending data to the event server 402. For example, the user device 401 may be a smartphone, tablet, laptop computer, desktop computer, or other suitable device. The user may access the media prompts, e.g., via a web application, mobile application, or website. The media prompts may be personalized for the user based on a stored account for the user at the web application, mobile application, or website. For example, the media prompts may suggest certain users whom the user may know based on stored connection data for the user and the user's connections. Media prompts may be provided to users on a one-time basis (e.g., when the user creates an account) or may be provided to users repeatedly. The user device 401 may submit requests to the event server 402 to access media prompts.

User responses are sent (415), e.g., by the user device 401 and are received (420), e.g., by the event server 402. User responses and other data may be sent and received over the Internet or other network. Received user data may be sent to the data server 403.

User data is stored (425), e.g., by the data server 403.

A request for stored data is sent (430), e.g., by the event server 402. The request for stored data may indicate a particular user or set of users. For example, after the event server 402 receives user data for a particular user, the event server 402 may request stored data to supplement the received user data.

Stored data is accessed (435), e.g., by the data server 403. Stored data may be data previously sent by users or otherwise associated with particular users. For example, the data may be availability data, interest data, connection data and location data previously sent by the user. The data may also be historical data indicating which events the user has previously participated in, how many events the user has participated in, which events the user's connections have participated in, what dates/times the user previously participated in events, and so on.

Stored data is outputted (440), e.g., by the data server 403. Stored data is received (445), e.g., by the event server 402.

The received data and the stored data are analyzed (450), e.g., by the event server 402. The analysis may involve comparing the received data with received data from other users.

Events are generated (455), e.g., by the event server 402. The events may have associated dates/times, activities, locations, and groups of users, which are determined based at least in part on the received data and/or stored data.

The generated events are outputted (460), e.g., by the event server 402. The events may be transmitted to each user associated with the events.

The events are displayed (465), e.g., by the user device 401. The displayed events may include a prompt for a user to indicate whether the user plans to participate in the events.

User responses to the events are sent (470), e.g., by the user device 401. The responses are analyzed (475), e.g., by the event server 402. The event server 402 may receive responses from multiple users. The user responses may include responses to invitations and evaluations of events.

User data is sent (480), by the event server 402 to the data server 403.

User data is received and stored (485) by the data server 403. The user data may be stored for use in future events.

The system 400 may also be configured to receive and store data about events from other sources such as businesses which host events.

Regarding the flowcharts in FIGS. 2, 3, and 4, the process flows depicted are merely embodiments of the disclosure and are not intended to limit the scope of the disclose described herein. For example, the steps recited in any of the method or process descriptions may be performed in any order and are not limited to the order presented.

Computing Systems

Figure 5:
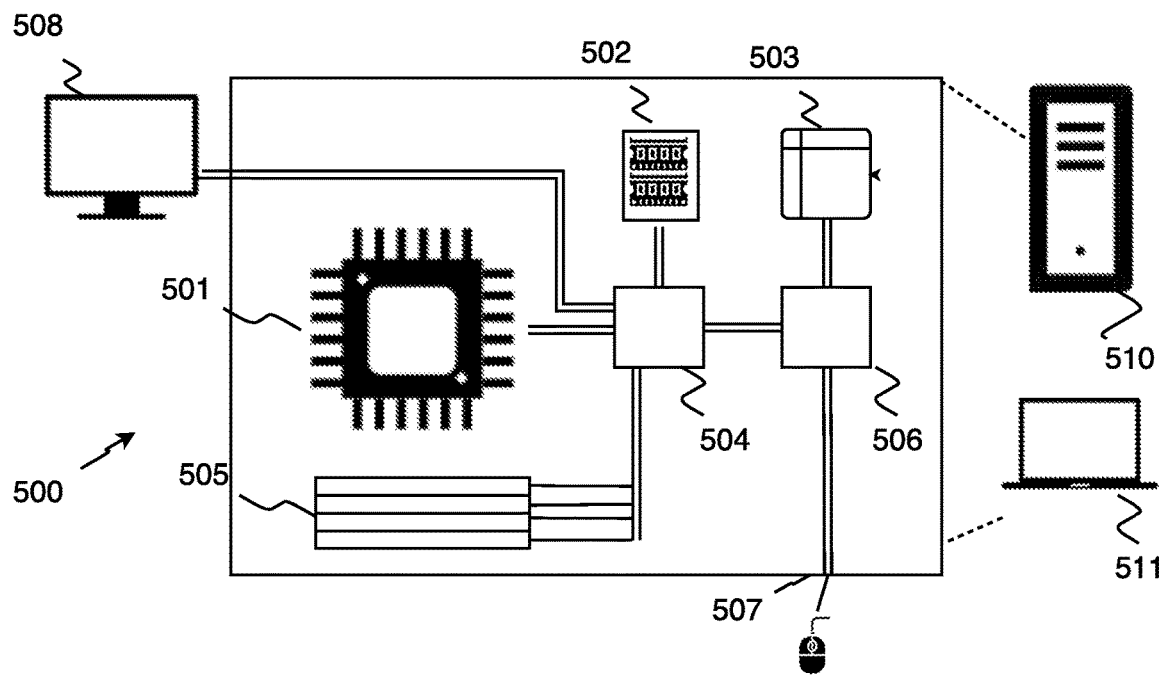
FIG. 5 illustrates an example computer device 500.
Figure 6:
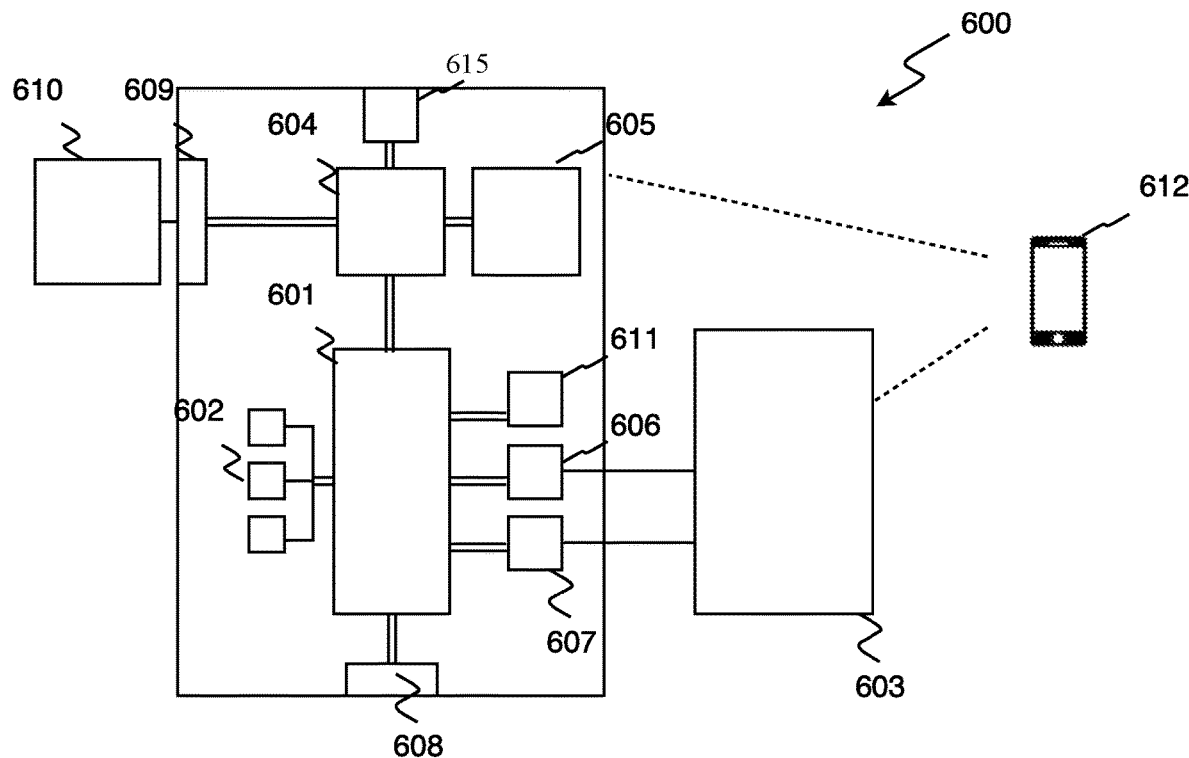
FIG. 6 illustrates an example mobile computer device 600.

FIGS. 5 and 6 illustrate an example generic computer device 500 and a generic mobile computer device 600, respectively, which may be used to implement the processes described herein. Computing device 500 represents any of a variety of computers, such as desktop computers, laptops, workstations, personal digital assistants, servers, blade servers, mainframes, and other suitable computers. Computing device 600 represents any of a variety of suitable mobile devices, including personal digital assistants, cellular telephones, smartphones, tablets, and other suitable computing devices. The devices and components shown, their connections and relationships, and their functions, are merely examples and are not meant to limit implementations of the inventions described or claimed in this document.

Computing device 500 includes a processor 501, memory 502, storage device 503, high-speed interface 504 connecting to memory 502, high-speed expansion ports 505, and low-speed interface 506 connecting to a low-speed bus 507 and storage device 503. Each of the components 501, 502, 503, 504, 505, and 506 are interconnected using various busses, and may be mounted on a common motherboard or in other manners as appropriate. The processor 501 can process instructions for execution within the computing device 500, including instructions stored in the memory 502 or on the storage device 503 to display graphical information for a graphical user interface on an external input/output device, such as display 508 coupled to high speed interface 504. In an embodiment, multiple processors and/or multiple busses may be used, as appropriate, along with multiple memories and types of memory. Also, multiple computing devices 500 may be connected, with each device providing portions of the necessary operations (e.g., as a server bank, a group of blade servers, or a multi-processor system).

The memory 502 stores information within the computing device 500. In an embodiment, the memory 502 is a volatile memory unit or units. In another implementation, the memory 502 is a non-volatile memory unit or units. The memory 502 may also be another form of computer-readable medium, such as a magnetic or optical disk.

The storage device 503 is capable of providing mass storage for the computing device 500. In an embodiment, the storage device 503 may be or contain a computer-readable medium, such as a floppy disk device, a hard disk device, an optical disk device, a tape device, a flash memory or other similar solid state memory device, or an array of devices, including devices in a storage area network or other configurations. A computer program product can be tangibly embodied in an information carrier. The computer program product may also contain instructions that, when executed, perform one or more processes, such as those described above. The information carrier may be a non-transitory computer- or machine-readable storage medium, such as the memory 502, the storage device 503, or memory on processor 501.

The high-speed controller 504 manages bandwidth-intensive operations for the computing device 500, while the low speed controller 506 manages lower bandwidth-intensive operations. Such allocation of functions is merely an example. In an embodiment, the high-speed controller 504 is coupled to memory 502, display 508 (e.g., through a graphics processor or accelerator), and to high-speed expansion ports 505, which may accept various expansion cards (not shown).

The computing device 500 may be implemented in a number of different forms, as shown in FIG. 5. For example, it may be implemented as a standard server 510, or multiple times in a group of such servers. It may also be implemented as part of a rack server system. In addition, it may be implemented in a personal computer 511 such as a laptop computer. Alternatively, components from computing device 500 may be combined with other components in a mobile device (not shown), such as device 600. Each of such devices may contain one or more of computing device 500, 600, and an entire system may be made up of multiple computing devices 500, 600 communicating with each other.

Computing device 600 includes a processor 601, memory 602, an input/output device such as a display 603, a communication interface 604, and a transceiver 605, among other components. The device 600 may also be provided with a storage device, such as a microdrive or other device, to provide additional storage. Each of the components 600, 601, 602, 603, 606, and 605 are interconnected using various busses, and several of the components may be mounted on a common motherboard or in other manners as appropriate.

The processor 601 can execute instructions within the computing device 600, including instructions stored in the memory 602. The processor may be implemented as a chipset of chips that include separate and multiple analog and digital processors. The processor may provide, for example, for coordination of the other components of the device 600, such as control of user interfaces, applications run by device 600, and wireless communication by device 600.

Processor 601 may communicate with a user through control interface 606 and display interface 607 coupled to a display 603. The display 603 may be, for example, a TFT LCD (Thin-Film-Transistor Liquid Crystal Display) or an OLED (Organic Light Emitting Diode) display, or other appropriate display technology. The display interface 607 may comprise appropriate circuitry for driving the display 603 to present graphical and other information to a user. The control interface 606 may receive commands from a user and convert them for submission to the processor 601. In addition, an external interface 608 may be provided in communication with processor 601, so as to enable near area communication of device 600 with other devices. External interface 608 may support, for example, wired communication in some implementations, or wireless communication in other implementations, and multiple interfaces may also be used.

The memory 602 stores information within the computing device 600. The memory 602 can be implemented as one or more of a computer-readable medium or media, a volatile memory unit or units, or a non-volatile memory unit or units. Expansion memory 610 may also be provided and connected to device 600 through expansion interface 609, which may include, for example, a SIM (Subscriber Identity Module) card interface. Such expansion memory 610 may provide extra storage space for device 600, or may also store applications or other information for device 600. Specifically, expansion memory 610 may include instructions to carry out or supplement the processes described above, and may also include secure information. Thus, for example, expansion memory 610 may be provided as a security module for device 600, and may be programmed with instructions that permit secure use of device 600. In addition, secure applications may be provided via the SIM cards, along with additional information, such as placing identifying information on the SIM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more processes, such as those described above. The information carrier is a computer- or machine-readable medium, such as the memory 602, expansion memory 610, memory on processor 601, or a propagated signal that may be received, for example, over transceiver 605 or external interface 608.

Device 600 may communicate wirelessly through communication interface 604, which may include digital signal processing circuitry where necessary. Communication interface 604 may provide for communications under various modes or protocols, such as SMS, EMS, or MMS messaging, LTE, GSM, CDMA, TDMA, PDC, WCDMA, CDMA2000, or GPRS, among others. Such communication may occur, for example, through radio-frequency transceiver 605. In addition, short-range communication may occur, such as using a Bluetooth, Wi-Fi, or other such transceiver (not shown). In addition, GPS (Global Positioning System) receiver module 615 may provide additional navigation- and location-related wireless data to device 600, which may be used as appropriate by applications running on device 600.

Device 600 may also communicate audibly using audio codec 611, which may receive spoken information from a user and convert it to usable digital information. Audio codec 611 may likewise generate audible sound for a user, such as through a speaker, e.g., in a handset of device 600. Such sound may include sound from voice telephone calls, may include recorded sound (e.g., voice messages, music files, etc.) and may also include sound generated by applications operating on device 600.

The computing device 600 may be implemented in a number of different forms. For example, it may be implemented as a cellular telephone or smartphone 612. It may also be implemented as a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions that can be executed by a processor, and can be implemented in a high-level procedural and/or object-oriented programming language, and/or in assembly/machine language. As used herein, the terms "machine-readable medium" "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube), LCD (liquid crystal display), or OLED (organic light-emitting diode) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A system serving at least 2,000 users comprising a processor and an associated memory or storage device wherein the processor executes stored instructions, and connects to electronic communication means when external communications are called for, to:
    a) register at least 2,000 users such that each user is given a unique identity with a unique user name and an associated password;
    b) solicit from each registered user a list of:
        i periods of time for which the user is available to participate in social events;
        ii personal interests which can be associated with an activity; and
        iii connections with whom the user would like to engage in social activities;
    c) use the associated memory or storage device to create a data store of the information solicited from the registered users;
    d) automatically, without any initiation request from any user, periodically at least monthly access the data store to create social events to suggest to multiple users wherein the creation involves:
        i identifying groups of users who have overlapping availabilities and personal interests and who have either a direct or indirect connection to every other user in the group wherein direct connection is used in the sense that the users know each other personally and wherein indirect connection is used in the sense of a connection to another user whom a given user does not know personally but to whom he is connected via one or more persons who are linked together by direct connections, one of which is to the given user;

ii creating a master list of candidate events that have time periods which overlap the mutual availabilities of the members of each group and involve an activity associated with an interest shared by members of each group;

iii stack ranking the candidate events in the master list by giving a higher score to those which involve groups with more users and groups with more direct connections between users in the group in the sense set forth in i above and for candidate events involving any given group giving a higher score to those which involve interests shared by more users in that group or activities whose durations more closely match the mutual availabilities of the members of the given group;

e) suggest that event or those events in decreasing order of rank to the members of the group or groups associated with the event or events by sending such members invitations;

f) receive responses to the invitations and send additional invitations or cancelation notices for those suggested events for which an insufficient number of acceptances to that event's invitations are received, g) update the data store with the responses to the invitations and the additional invitations; and h) apply algorithms, machine learning or artificial intelligence to these responses to improve the creation of subsequent social events.

2. The system of claim 1 wherein artificial intelligence is used to create and suggest social events that are more likely to be accepted by their invitees.

3. The system of claim 1 wherein businesses are evaluated for compatibility with a candidate event based on their availability and capacity to host that candidate event.

4. The system of claim 1 wherein a business may bid or otherwise provide an incentive for that business to be paired with candidate event.

5. The system of claim 1 wherein users have also provided the system with location information and such information is added to the data store.

6. The system of claim 5 wherein the group of users is configured based on a threshold distance or travel duration to a median location.

7. The system of claim 1 wherein user preferences may be inputted by users or discerned by the system from the reactions of users to invitations to social events and are used to affect the creation of further social events.

8. The system of claim 1 wherein any user or the system may limit one or more of the time period, activity, location and list of attendees to drive the creation of a particular social event.

9. The system of claim 1 wherein the possible time periods, activities or locations, and lists of attendees are analyzed to rank or score social events.

10. The system of claim 1 wherein a level of interconnectedness between invitees, a popularity of time periods and activities and locations, and a compatibility of these components affect the rank or score of social events.

11. The system of claim 1 wherein the rank or score of each social event is maximized by the system making changes to the time period, activity or location, or list of attendees.

12. The system of claim 1 wherein a given user's exposure to a time period, activity or location or list of attendees is limited by the system making changes to a social event's list of attendees.

13. The system of claim 12 wherein the changes to the social event's list of attendees is to account for an earlier suggested social event that is similar.

14. The system of claim 1 wherein the social events must fall within a threshold rank or score to be suggested.

15. The system of claim 1 wherein an activity is associated with a minimum, desired, or maximum duration or a minimum, desired, or maximum number of participants.

16. The system of claim 1 wherein events are suggested such that each user or group in a given network is suggested a minimum, desired, or maximum number of events.

\* \* \* \* \*